(12) United States Patent
Kim et al.

(10) Patent No.: US 12,097,840 B2
(45) Date of Patent: Sep. 24, 2024

(54) METHOD AND APPARATUS FOR CONTROLLING POWER OF HYBRID VEHICLE CONSIDERING DRIVING ENVIRONMENT

(71) Applicant: KAIST (Korea Advanced Institute of Science and Technology), Daejeon (KR)

(72) Inventors: Kyung Soo Kim, Daejeon (KR); Kyung Hwan Choi, Daejeon (KR); In Gwun Jang, Daejeon (KR)

(73) Assignee: KAIST (Korea Advanced Institute of Science and Technology), Daejeon (KR)

( * ) Notice: Subject to any disclaimer, the term of this patent is extended or adjusted under 35 U.S.C. 154(b) by 130 days.

(21) Appl. No.: 17/583,312

(22) Filed: Jan. 25, 2022

(65) Prior Publication Data

US 2022/0242388 A1 Aug. 4, 2022

(30) Foreign Application Priority Data

Jan. 25, 2021 (KR) .................. 10-2021-0010069

(51) Int. Cl.
*B60W 20/10* (2016.01)
*B60W 20/20* (2016.01)
*G01C 21/34* (2006.01)

(52) U.S. Cl.
CPC ............ *B60W 20/10* (2013.01); *B60W 20/20* (2013.01); *G01C 21/3469* (2013.01); *B60W 2510/083* (2013.01)

(58) Field of Classification Search
CPC ...... B60W 10/08; B60W 20/10; B60W 20/20; B60W 2510/083; B60W 2510/244; B60W 2710/0666; B60W 2710/083; B60L 58/12; B60L 58/13; G01C 21/3469
See application file for complete search history.

(56) References Cited

U.S. PATENT DOCUMENTS

| | | | |
|---|---|---|---|
| 2011/0118921 A1* | 5/2011 | Park .................. | B60W 10/08 180/65.265 |
| 2019/0389451 A1* | 12/2019 | Huang ................ | G05D 1/0217 |
| 2020/0198495 A1* | 6/2020 | Rizzoni .............. | B60W 10/06 |
| 2020/0391721 A1* | 12/2020 | Wang ................. | B60W 10/06 |

FOREIGN PATENT DOCUMENTS

CN 102416950 B * 6/2013

* cited by examiner

*Primary Examiner* — Navid Z. Mehdizadeh
*Assistant Examiner* — Caitlin R McCleary
(74) *Attorney, Agent, or Firm* — LEX IP MEISTER, PLLC (57) ABSTRACT

A power control method and apparatus in consideration of a driving environment of a hybrid vehicle is provided. The method and apparatus for controlling a power of a hybrid vehicle enable real-time application while having adaptability to various driving environment.

For a hybrid vehicle, the power control method and apparatus provide optimum fuel efficiency performance in any driving environment through power control considering the current driving environment in real time.

13 Claims, 12 Drawing Sheets

METHOD AND APPARATUS FOR CONTROLLING POWER OF HYBRID VEHICLE CONSIDERING DRIVING ENVIRONMENT

BACKGROUND OF THE INVENTION

Field of the Invention

The present invention relates to a method and an apparatus for controlling power of a hybrid vehicle in consideration of driving environment, and more particularly, to a method and an apparatus for controlling power of a hybrid vehicle implemented to enable real-time application while having adaptability to various driving environment.

Description of the Related Art

A hybrid vehicle has two power sources: an engine and a motor. The engine has low fuel consumption per energy at medium and high output, and the motor has high efficiency throughout the driving range. Power control of the hybrid vehicle should be performed in consideration of the efficiency characteristics of these two power sources. Since the power control strategy has a major effect on the fuel efficiency of the vehicle, it is very important to derive a power control strategy for optimal fuel efficiency performance. The conventional optimal power control problem is to minimize the total fuel consumption for all the time defined in the driving environment, maintain the total battery energy used at 0, and find the engine torque Te satisfying the required torque condition, that is, T=Te+Tm. However, since such approach requires information regarding the required torque at all times, the optimal power control problem as above is a problem that can only be solved when the driving environment are predefined. In general hybrid vehicle power control, future driving information cannot be known, so the above optimal power control problem cannot be solved in real time, and there is a problem that it cannot be used immediately in deriving a power control strategy.

SUMMARY OF THE INVENTION

The present invention was devised to solve such a problem, and an object of the present invention is to provide a method and an apparatus for controlling power of a hybrid vehicle which derives optimum fuel efficiency performance in any driving environment through power control that considers the current driving environment in real time.

In order to achieve the above object, there is provided a method for controlling power of a hybrid vehicle in consideration of the driving environment, comprising the steps of: (a) calculating a weight (hereinafter, 'equivalent factor') multiplied by a battery power in equivalent fuel consumption defined as a sum of an instantaneous fuel consumption and a weighted battery power; (b) calculating, when the equivalent fuel consumption is defined differently based on a specific reference value of a driver's required power (hereinafter, 'required power') as a boundary, the specific reference value (hereinafter, 'power threshold'); (c) calculating torque commands for an engine and a motor using the equivalent factor and the power threshold; and, (d) transmitting the calculated engine torque command to an engine control unit and the calculated motor torque command to a motor control unit.

The step (a) may include the steps of: (a1) receiving, as input, required torque ($T_k$), engine speed ($w_{e,k}$), and battery power ($P_{b,k}$) of previous step (k=n−1) respectively from a pedal map, an engine control unit, and a battery management system; (a2) calculating a fuel margin (($\Delta \dot{m}_{f,k}$)) of the previous step (k=n−1) by $\Delta \dot{m}_{f,k} = \dot{m}_{f,k}(\omega_{e,k}, T_{e,k}) - \dot{m}_{f,k}(\omega_{e,k}, T_k)$; (a3) summing up the fuel margin of all previous steps (k=1 to k=n-1); (a4) summing up the battery power ($P_{b,k}$) of all previous steps (k=1 to k=n-1); and, (a5) calculating the equivalent factor of current step (k=n) from summed up values of steps (a3) and (a4), wherein $T_{e,k}$ is an engine torque command at step k.

The step a5 is preferably calculated by $$\lambda_n = -\frac{\sum_{k=1}^{n-1} \Delta \dot{m}_{f,k}}{\sum_{k=1}^{n-1} P_{b,k}}.$$

Or, the step (a5) may be calculated by $$\lambda_n = -\frac{\left(\gamma \sum_{k=1}^{n-2} \Delta \dot{m}_{f,k} + \Delta \dot{m}_{f,n-1}\right)}{\left(\gamma \sum_{k=1}^{n-2} P_{b,k} + P_{b,n-1}\right)},$$

where y is a forgetting factor to reduce weight on past information.

The required torque ($T_{n-1}$), the engine speed ($\omega_{e,n-1}$) and the battery power ($P_{b,n-1}$) of the previous step, and the fuel margin ($\Delta m_{f,n-1}$) of the previous step are preferably stored in a storage device, wherein the value stored in the storage device is used as $T_{e,n-1}^*$ in step (a2)

The step (b) may include the steps of: (b1) calculating an SOC error of current step (k=n) by $e_{SOC,n} = SOC_n - SOC_0$; and, (b2) calculating the power threshold of the current step that satisfies battery energy condition by using the $e_{SOC,n}$.

The battery energy condition is preferably given as $\int_{t_0}^{t} P_b(T) d\tau = 0$ or $SOC(t_0) = SOC(t)$.

The power threshold of the current step in step (b2) is preferably calculated by $$P_{th,n} = P_{th,0} + K_p e_{SOC,n} + K_I \sum_{k=1}^{n} e_{SOC,k},$$

where the $P_{th,0}$ is an initial set value of the power threshold and $K_p$, $K_I$ are coefficients of $e_{SOC,n}$ and $$\sum_{k=1}^{n} e_{SOC,k},$$

respectively.

The step (c) may include the steps of: (c1) calculating an optimum engine torque of current step using the equivalent factor calculated in step (a) and the power threshold calculated in step (b); (c2) calculating a motor torque of the current step.

The optimum engine torque of the current step (k=n) of the step (c1) is preferably determined as an engine torque value that minimizes the equivalent fuel consumption ($\dot{m}_{eq,n}$) of the current step by $$T_{e,n}^* = \underset{T_e}{\arg\min}\, \dot{m}_{eq,n} = \begin{cases} f(w_{m,n}, \lambda_n, T_n) & (P_n \geq P_{th,n}) \\ 0 & (P_n < P_{th,n}) \end{cases},$$

where $W_{m,n}$ is a motor speed of the current step, and $P_n$ is the required power of the current step.

The equivalent fuel consumption ($\dot{m}_{eq,n}$) of the current step is preferably calculated by $$\dot{m}_{eq,n} = \begin{cases} \dot{m}_{f,n} + \lambda_n P_{b,n} & (P_n \geq P_{th,n}) \\ \dot{m}_{f,n} & (P_n < P_{th,n}) \end{cases}.$$

Between the step (c1) and the step (c2), the method may further comprise the step of: (c11) limiting the calculated engine torque within a specific range, wherein, in the step (c11), a final engine torque command is determined by $$T^*_{e,n} = \begin{cases} T_e^{min} & (T^*_{e,n} < T_e^{min}) \\ T^*_{e,n} & (T_e^{min} \leq T^*_{e,n} \leq T_e^{max}) \\ T_e^{max} & (T^*_{e,n} > T_e^{max}) \end{cases},$$

where $T_e^{min}$ is minimum reference value of engine torque, and $T_e^{max}$ is maximum reference value of engine torque.

A motor torque command of the current step in step (c2) is preferable calculated by $T^*_{m,n} = T_n - T^*_{e,n}$.

According to other aspect of the present invention, there is provided an apparatus for controlling power of a hybrid vehicle in consideration of the driving environment, comprising: an equivalent factor calculation unit for calculating a weight (hereinafter, 'equivalent factor') multiplied by a battery power in equivalent fuel consumption defined as a sum of an instantaneous fuel consumption and a weighted battery power; a power threshold calculation unit for calculating, when the equivalent fuel consumption is defined differently based on a specific reference value of a driver's required power (hereinafter, 'required power') as a boundary, the specific reference value (hereinafter, 'power threshold'); and, power control decision unit for calculating a torque command for an engine and a motor using the equivalent factor and the power threshold, and for transmitting the calculated engine torque command to an engine control unit and the calculated motor torque command to a motor control unit.

According to another aspect of the present invention, there is provided an apparatus for controlling power of a hybrid vehicle in consideration of the driving environment, comprising: at least one processor; and at least one memory for storing computer-executable instructions, wherein the computer-executable instructions stored in the at least one memory, when executed by the at least one processor, causes the at least one processor to perform operations comprising: (a) calculating a weight (hereinafter, 'equivalent factor') multiplied by a battery power in equivalent fuel consumption defined as a sum of an instantaneous fuel consumption and a weighted battery power; (b) calculating, when the equivalent fuel consumption is defined differently based on a specific reference value of a driver's required power (hereinafter, 'required power') as a boundary, the specific reference value (hereinafter, 'power threshold'); (c) calculating torque commands for an engine and a motor using the equivalent factor and the power threshold; and, (d) transmitting the calculated engine torque command to an engine control unit and the calculated motor torque command to a motor control unit.

DETAILED DESCRIPTION OF THE INVENTION

Hereinafter, exemplary embodiments of the present invention will be described in detail with reference to the accompanying drawings. Prior to the description of the present invention, it will be noted that the terms and wordings used in the specification and the claims should not be construed as general and lexical meanings, but should be construed as the meanings and concepts that agree with the technical spirits of the present invention, based on the principle stating that the concepts of the terms may be properly defined by the inventor(s) to describe the invention in the best manner. Therefore, because the examples described in the specification and the configurations illustrated in the drawings are merely for the preferred embodiments of the present invention but cannot represent all the technical sprints of the present invention, it should be understood that various equivalents and modifications that may replace them can be present.

Figure 1A:
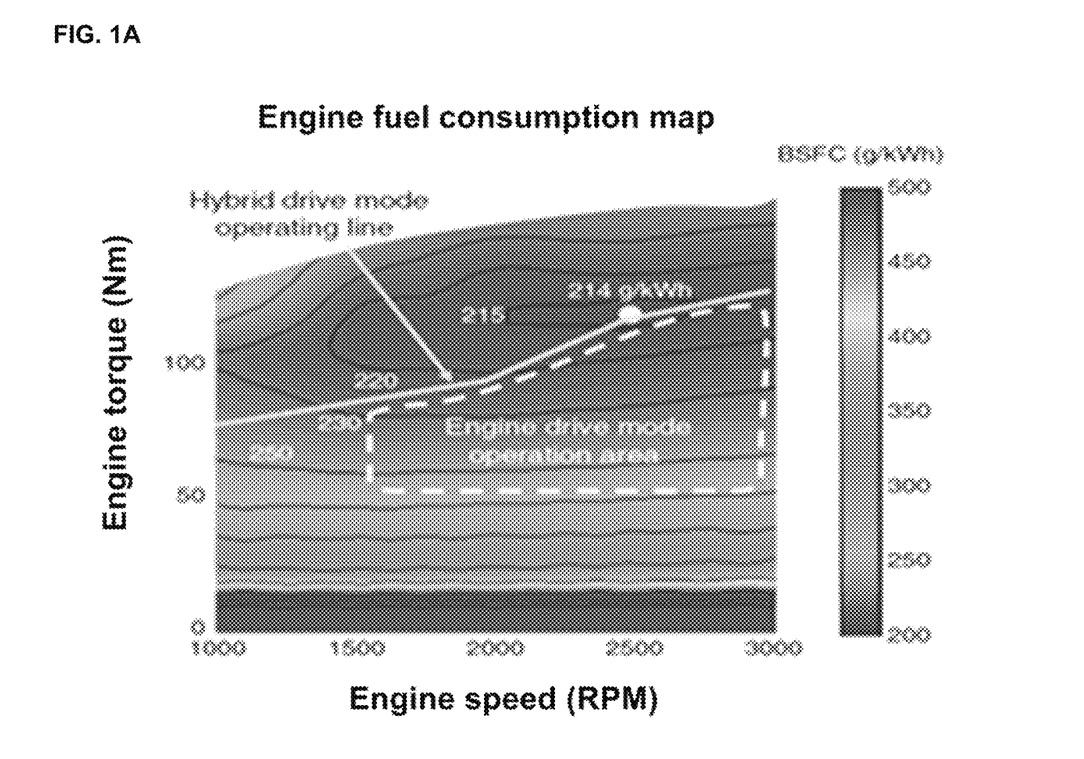
FIGS. 1A-1C are diagrams illustrating comparison of the efficiency characteristics of an engine and a motor in a hybrid vehicle and fuel consumption for each power control strategy of the hybrid vehicle, respectively
Figure 1B:
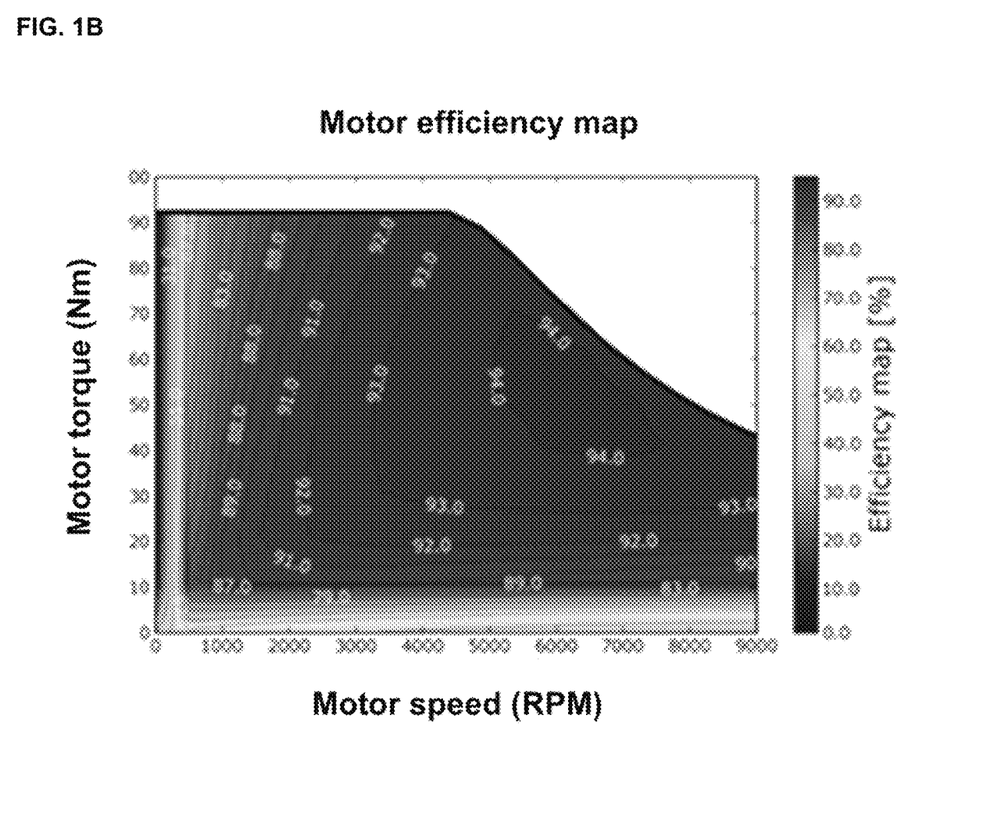
Figure 1C:
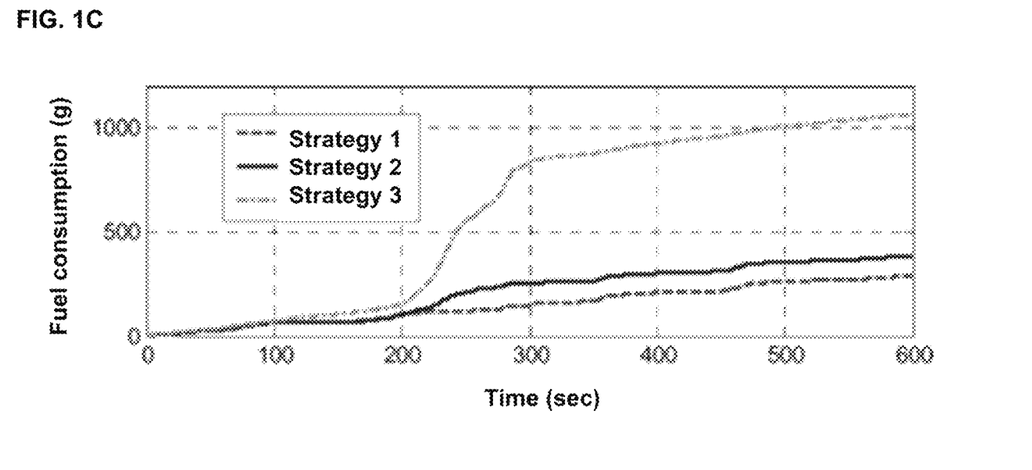

FIGS. 1A-1C are diagrams illustrating comparison of the efficiency characteristics of an engine and a motor in a hybrid vehicle and fuel consumption for each power control strategy of the hybrid vehicle, respectively. FIG. 1A is an example of an engine fuel consumption map, FIG. 1B is an example of a motor efficiency map, and FIG. 1C is an exemplary diagram comparing fuel consumption for each power control strategy of the hybrid vehicle.

As shown in FIG. 1A, the engine has a small amount of fuel consumption per energy mainly in the medium and high output region, and as shown in FIG. 1B, the motor has high efficiency throughout the driving region. Also, as shown in FIG. 1C, there is a large difference in fuel consumption for each power control strategy under the same driving conditions. Therefore, it is important to derive a proper power control strategy for optimal fuel efficiency performance.

Figure 2:
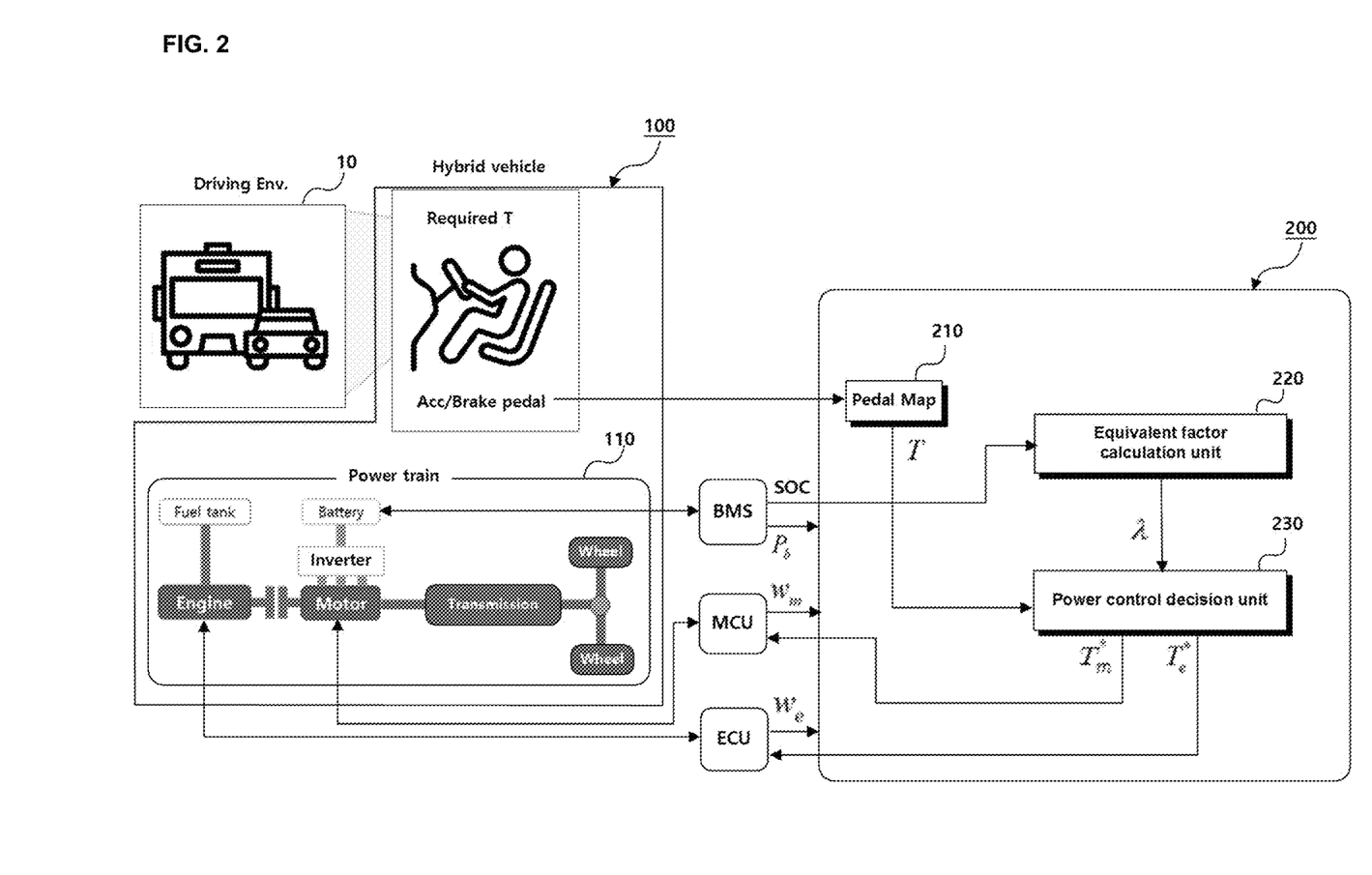
FIG. 2 is a diagram showing the configuration of a conventional power control apparatus for a hybrid vehicle that calculates an equivalent factor by using state of charge (SOC)
Figure 3:
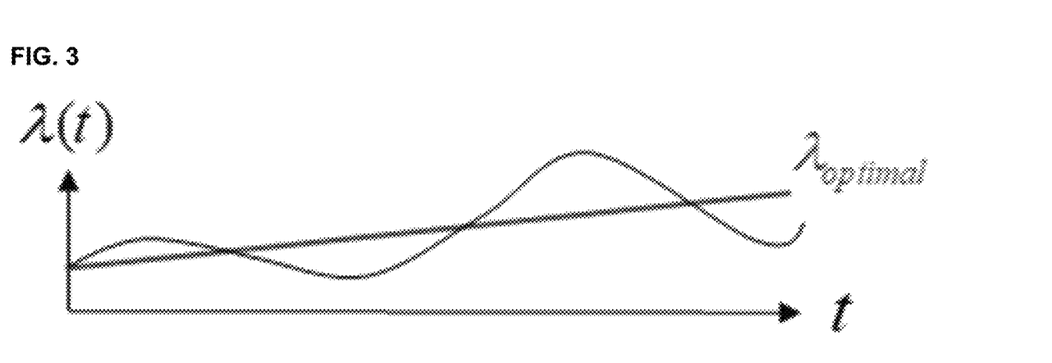
FIG. 3 is a graph illustrating a case of divergence when calculating the equivalent factor shown in FIG. 2.

FIG. 2 is a diagram showing the configuration of a conventional power control apparatus 200 for a hybrid vehicle 100 that calculates an equivalent factor using a state of charge (SOC), and FIG. 3 is a graph illustrating a case of divergence when calculating an equivalent factor.

As described above, the conventional optimal power control problem is a global optimization problem. That is, it is to find the engine torque Te that minimizes the total fuel consumption, maintains the total used battery energy at 0, and satisfies the required torque condition, i.e., T=Te+Tm for all times defined in the driving environment 10. In this case, since the required torque information is required at all times, the optimal power control problem as above is a problem to be solved only in a situation in which the driving environment 10 is predefined. Since future driving information cannot be known in general hybrid vehicle power control, it can be seen that the above optimal power control problem cannot be solved in real time, and thus cannot be directly utilized in deriving a power control strategy.

When this global optimization problem is referred to as 'problem 1', problem 1 is to find Te(t) that minimizes $\int_{t_o}^{t_f} \dot{m}_f(t)dt$ with respect to t, which is $t_0 \leq t \leq t_f$, where $\int_{t_o}^{t_f} P_b(t)dt$, and T(t)=Te(t)+Tm(t)

This problem 1 can be solved by converting it to 'problem 2', which is an instantaneous optimization problem, and problem 2 is to obtain Te(t) that minimizes $\dot{m}_f(t)+\lambda P_b(t)$ by the power control determination unit 230, where T(t)=Te(t)+Tm(t).

Problem 2 aims to minimize the equivalent fuel consumption $\dot{m}_f(t)+\lambda P_b(t)$, which is the [weighted] sum of instantaneous fuel consumption and weighted battery power, and allows the two energy sources to be used in a balanced way by adding battery power to the objective function. With this device, the existing battery energy condition $\int_{t_o}^{t_f} P_b(t)dt=0$ is taken into account indirectly.

Power control based on problem 2 generally has lower fuel efficiency compared to power control based on problem 1, but similar results to problem 1 may be obtained depending on the setting of the equivalent factor A that determines the ratio of instantaneous fuel consumption and battery power usage. Therefore, the setting of the equivalent factor is very important.

The equivalent factor calculated by the equivalent factor calculator 220 may be obtained by $\lambda(t)=\lambda_0+K_p e_{soc}(t)+K_I \int_{t_o}^{t} e_{soc}(\tau)d\tau$, where $e_{soc}(t)=SOC(t)-SOC(t_0)$, and $\dot{SOC}(t)=-kP_b(t)$.

This is a method of calculating the equivalent factor through PI (proportional-integral) control so that the state of charge (SOC) does not deviate significantly from the initial value (SOC($t_0$)). Through this calculation method, the battery energy condition in problem 1 can be indirectly satisfied. Since the equivalent factor, which is a constant that satisfies the battery energy condition for a given driving environment, is uniquely determined, it can be seen that the equivalent factor obtained by this calculation method indirectly includes information about the driving environment.

However, as shown in the exemplary graph of FIG. 3, the PI controller has a risk of divergence depending on the setting of the control gains ($K_p$, $K_I$). The ideal equivalent factor that satisfies the battery energy condition changes according to the driving environment, but it may not be able to properly follow the changed value according to the control gain setting of the PI controller. Therefore, this calculation method cannot guarantee the accurate calculation of the equivalent factor, and it is difficult to derive the optimal fuel efficiency performance because the information of the driving environment is not directly considered.

Figure 4:
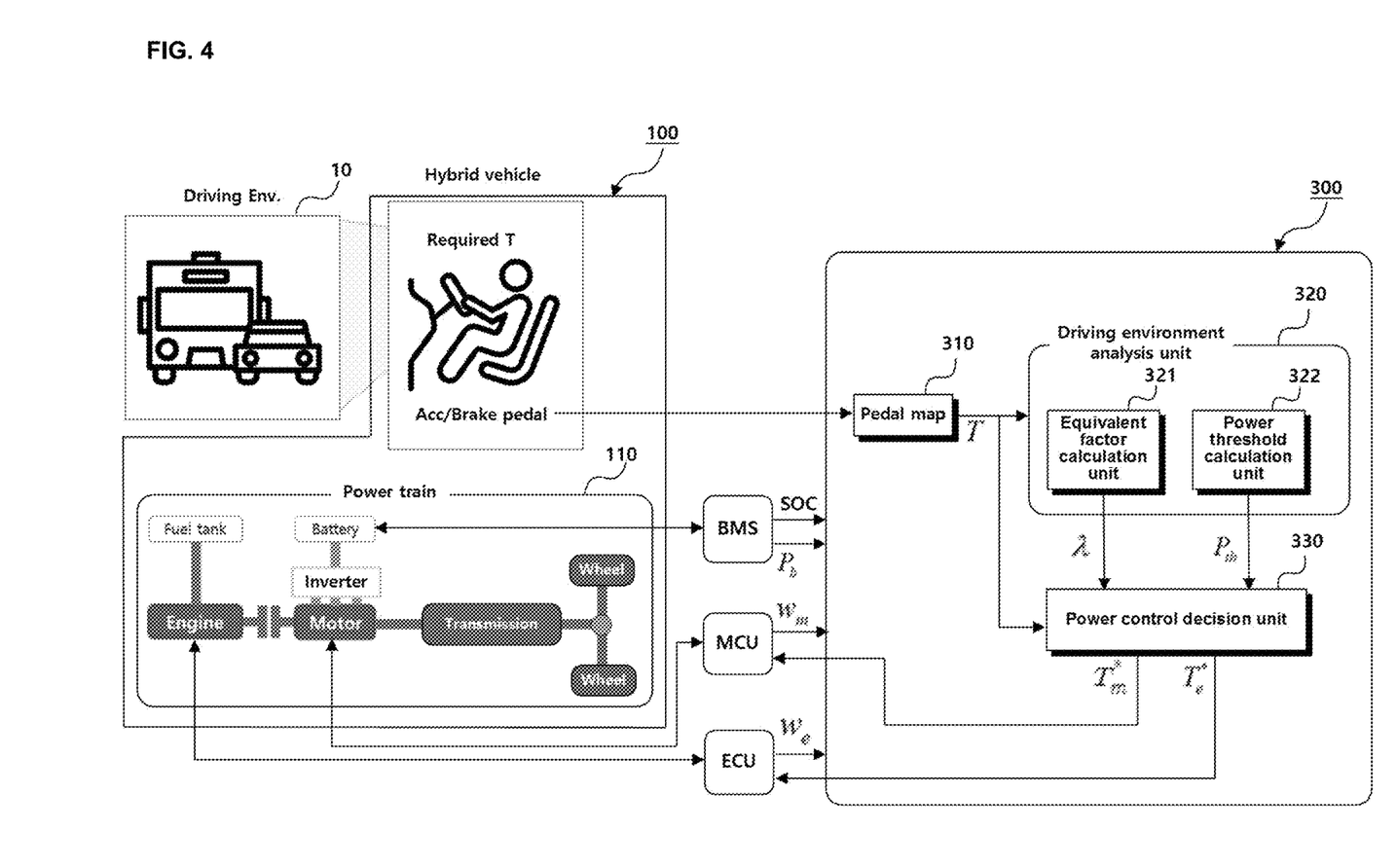
FIG. 4 is a diagram showing the configuration of a power control apparatus according to the present invention, in consideration of the driving environment of the hybrid vehicle.
Figure 5:
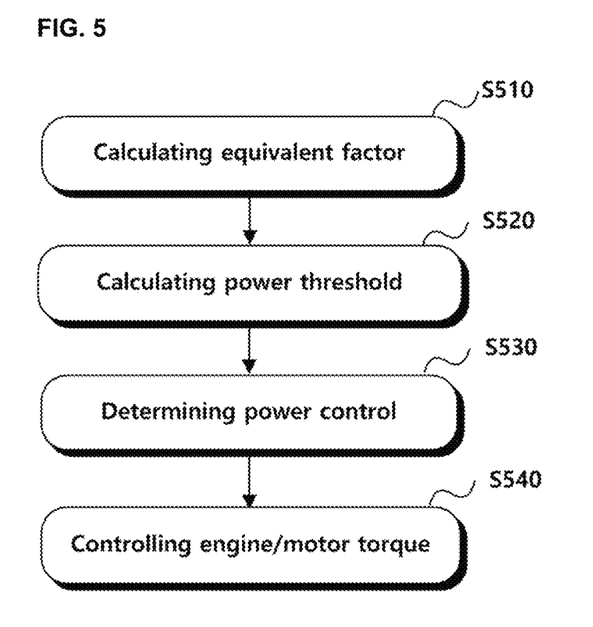
FIG. 5 is a flowchart illustrating an entire process of performing a power control method according to the present invention, in consideration of the driving environment of the hybrid vehicle.

FIG. 4 is a diagram showing the configuration of the power control apparatus 300 of the present invention, in consideration of the driving environment 10 of the hybrid vehicle 100, and FIG. 5 is a flowchart showing the entire process of performing the power control method of the present invention, in consideration of the driving environment of the hybrid vehicle.

The power control method in consideration of the driving environment 10 of the hybrid vehicle of the present invention is an improved power control method that is based on an equivalent fuel consumption minimization strategy and can be implemented in real time while having adaptability to various driving environment. Since the present invention is related to a power control apparatus and a method applicable to all types of hybrid vehicles having two or more power sources, such as a hybrid, a plug-in hybrid, a fuel cell hybrid vehicle, and the like, it can be utilized as a general power control methodology for a hybrid vehicle.

The core of the present invention is to utilize the driver's required torque (T) information in the "driving environment analysis unit" that analyzes the current driving environment 10. The driver determines the required torque according to the observation of the driving environment 10 and applies the requested value to the accelerator or brake pedal, and the information from the accelerator or brake pedal is converted into the required torque T through the pedal map 310. By directly utilizing the required torque (T) information, the characteristics of the current driving environment 10 are accurately analyzed.

The characteristics of the driving environment are defined by two control parameters: equivalent factor (A) calculated by the equivalent factor calculation unit 321 of the driving environment analysis unit 320 and the power threshold value ($P_{th}$) calculated by the power threshold value calculation unit 322 of the driving environment analysis unit 320. The torque command ($T_m^*$, $T_e^*$) of the motor and the engine is determined in the "power control determination unit 330" by using these two control parameters and the driver's requested torque information.

Referring to FIG. 5, the equivalent factor calculating unit 321 calculates the equivalent factor A from the required torque T information of the pedal map 310 (S510), and the power threshold calculating unit 322 calculates the power threshold $P_{th}$ (S520). The power control determination unit 330 determines the power control by calculating the torque for the motor and the torque for the engine using the calculated equivalent factor λ and the power threshold $P_{th}$ (S530). A motor torque command $T_m^*$ instructing to control with the calculated torque to a motor control unit (MCU), and an engine torque command $T_e^*$ to an engine control unit (ECU) (S540), and make the MCU and the ECU to control the motor torque and engine torque.

Hereinafter, a method of calculating the equivalent factor λ will be described in detail with reference to FIGS. 6 and 7, and a method of calculating the power threshold $P_{th}$ will be described in detail with reference to FIG. 8. Also, a method of calculating the torque $T_m^*$ for the motor and the torque $T_e^*$ for the engine using the equivalent factor λ and the power threshold $P_{th}$ will be described in detail with reference to FIG. 9.

Figure 6:
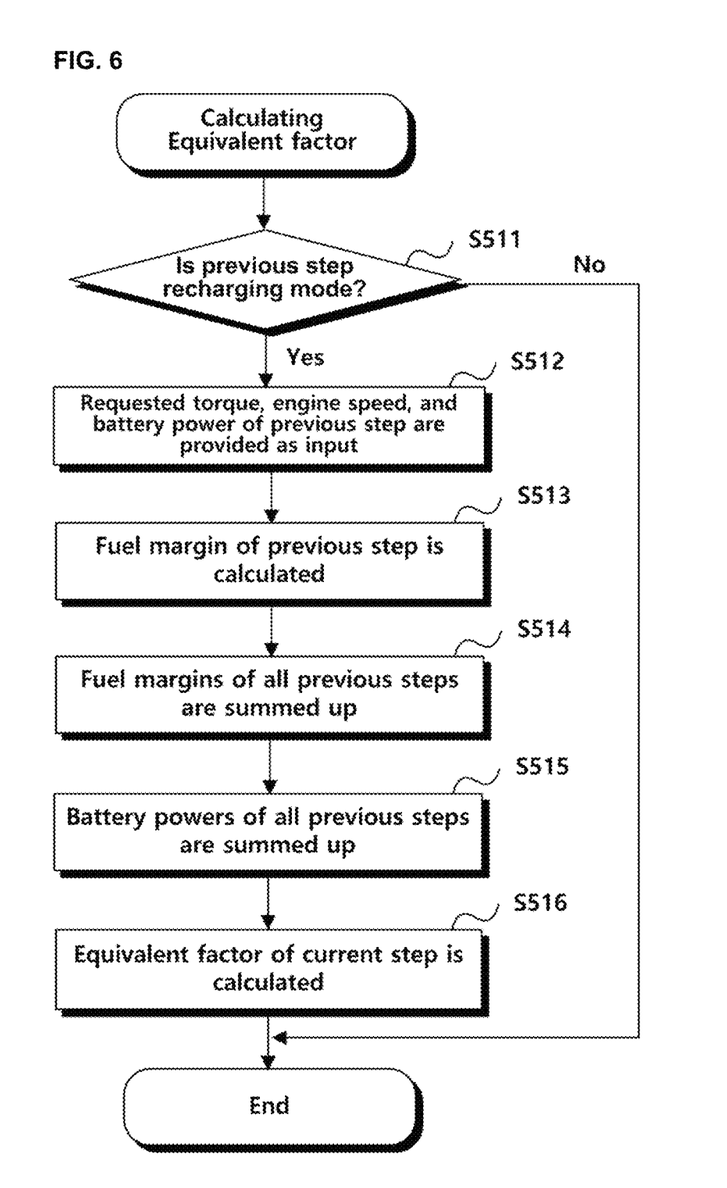
FIG. 6 is a flowchart illustrating an equivalent factor calculation process of an equivalent factor calculation unit of a power control apparatus according to the present invention, in consideration of the driving environment of the hybrid vehicle.
Figure 7A:
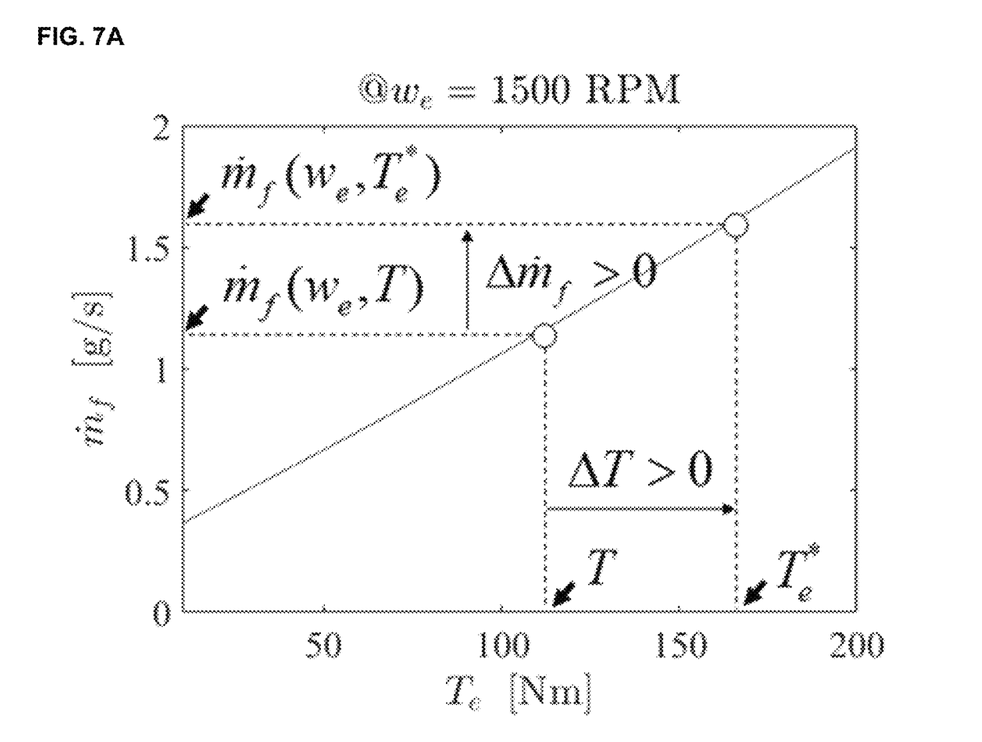
FIGS. 7A and 7B are views showing a torque margin and a fuel margin, and a powertrain state in a recharging mode, respectively.
Figure 7B:
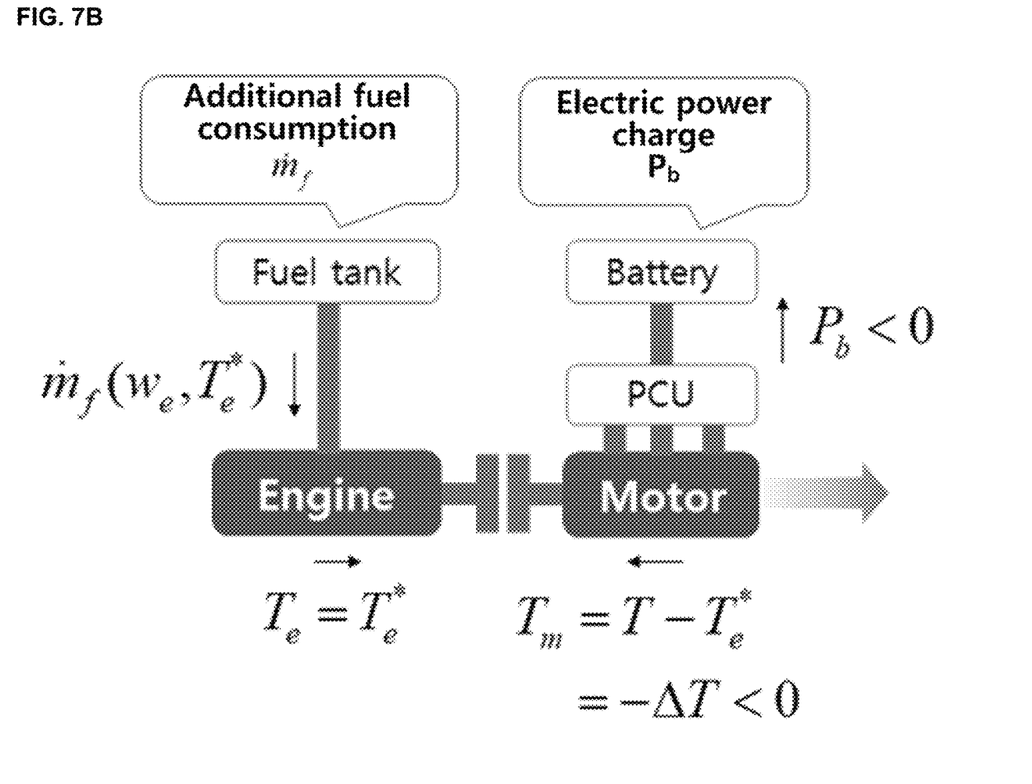

FIG. 6 is a flowchart illustrating an equivalent factor calculation process of the equivalent factor calculation unit 321 of the power control apparatus in consideration of the driving environment of the hybrid vehicle of the present invention, and FIGS. 7A and 7B are diagrams illustrating torque margin and fuel margin, and a powertrain state in a recharging mode, respectively.

The present invention redefines equivalent fuel consumption.

That is, in the conventional equivalent fuel consumption minimization strategy, the equivalent fuel consumption ($m_{eq}$) is defined by adding the instantaneous fuel consumption amount (mf) and the weighted value of the battery power ($P_b$). This can be expressed as follows. Here, the weight A is the equivalent factor.

$$\dot{m}_{eq} = \dot{m}_f + \lambda P_b$$

On the other hand, in the present invention, the equivalent fuel consumption is defined differently according to the value of the driver's demand power P, and it is expressed as follows.

$$\dot{m}_{eq} = \begin{cases} \dot{m}_f + \lambda P_b & (P \geq P_{th}) \\ \dot{m}_f & (P < P_{th}) \end{cases} \quad \text{[Equation 1]}$$

Here, the driver's demanded power P is defined as the product of the driver's demanded torque T and the powertrain speed, that is, the motor speed $W_m$, and is thus expressed as $P = T \cdot W_m$.

According to Equation 1, when the required power is equal to or greater than the power threshold ($P_{th}$), the equivalent fuel consumption is defined as ($\dot{m}_f + \lambda P_b$) as the conventional equivalent fuel consumption, and when the required power is less than the power threshold ($P_{th}$), the equivalent fuel consumption is defined only with the instantaneous fuel consumption ($\dot{m}_f$).

The key to hybrid power control is to 1) produce electric energy (regenerative braking mode, recharging mode), and 2) optimize the use of this electric energy (EV mode, assist mode) to minimize fuel consumption.

In the first core of electric energy production, electric energy can be obtained from vehicle kinetic energy without cost in the regenerative braking mode. However, in the recharging mode, electric energy is produced by the engine torque margin, which causes additional fuel consumption. Therefore, for the electric energy production in the recharge mode, it is necessary to analyze the profit and loss from the energy point of view.

Instantaneous fuel consumption ($\dot{m}_f$) can be expressed as a function of engine speed ($w_e$) and engine torque ($T_e$), and tends to be proportional to engine torque ($T_e$). That is, it becomes $\dot{m}_f(\omega_e, T_e) \propto T_e$.

$$\Delta \dot{m}_f = \dot{m}_f(\omega_e, T_e^*) - \dot{m}_f(\omega_e, T) \quad \text{[Equation 2]}$$

The fuel margin ($\Delta \dot{m}_f$) is defined as the difference between the instantaneous fuel consumption ($\dot{m}_f(\omega_e, T_e^*)$) at the engine torque ($T_e^*$) determined as shown in Equation (2) and the instantaneous fuel consumption ($\dot{m}_f(\omega_e, T)$) at the required torque (T). Referring to FIG. 7A, the positive torque margin (ΔT>0) in the recharging mode results in a positive fuel margin ($\Delta \dot{m}_f > 0$), that is, additional fuel consumption. Referring to FIG. 7B, the motor generates electricity corresponding to the torque margin ($T_m = -\Delta T$) to charge the battery with electric power as much as $P_b$.

The equivalent fuel consumption is expressed as Equation (3).

$$\dot{m}_{eq} = \dot{m}_f(w_e, T_e^*) + \lambda P_b \quad \text{[Equation 3]}$$
$$= \dot{m}_{eq}(w_e, T) + \dot{m}_{eq}(w_e, \Delta T)$$

where $\dot{m}_{eq}(\omega_e, T) = \dot{m}_f(\omega_e, T)$ and $m_{eq}(\omega_e, \Delta T) = \Delta \dot{m}_f + \lambda P_b$.

In Equation 3, $\dot{m}_{eq}(w_e, T)$ is equivalent fuel consumption for the required torque, and $\dot{m}_{eq}(\omega_e, \Delta T)$ means additional equivalent fuel consumption by recharging.

If the additional equivalent fuel consumption due to recharging is 0, the electric energy production by recharging is performed without energy loss in terms of equivalent fuel consumption, which means that electric energy production is possible without any cost in the same way as regenerative braking. The equivalent factor derived from the condition should be used for power control.

$$\dot{m}_{eq}(w_e, \Delta T) = \Delta \dot{m}_f + \lambda P_b = 0 \quad \text{[Equation 4]}$$

$$\lambda = -\frac{\Delta \dot{m}_f}{P_b} \quad \text{[Equation 5]}$$

That is, by making the condition of Equation 4 to be satisfied, the equivalent factor λ of Equation 5 is calculated therefrom. At this time, Equation 5 represents the equivalent factor calculated for one driving condition, and the calculating method of the equivalent factor in which all the driving environment from the start of driving (k=1) to the previous step (k=n−1) are taken into account as an average is shown in Equation (6).

$$\lambda_n = \frac{\sum_{k=1}^{n-1} \Delta \dot{m}_{f,k}}{\sum_{k=1}^{n-1} P_{b,k}} \quad \text{[Equation 6]}$$

Furthermore, in order to appropriately change the equivalent factor according to a change in the driving environment, the forgetting factor (λ) is applied to reduce the weight for the past information in the equivalent factor calculation, and it can be expressed as Equation 7.

$$\lambda_n = \frac{-\left(\gamma \sum_{k=1}^{n-2} \Delta \dot{m}_{f,k} + \Delta \dot{m}_{f,n-1}\right)}{\left(\gamma \sum_{k=1}^{n-2} P_{b,k} + P_{b,n-1}\right)} \quad \text{[Equation 7]}$$

After all, with reference to the flowchart of FIG. 6, the process of obtaining the equivalent factor of the current step of Equation 6 is summarized as follows.

If the previous step (k=n−1) was a recharging mode (S511), the requested torque T, engine speed $w_e$, and battery power $P_b$ of the previous step are provided as input (S512). The engine torque command $T_e^*$ of the previous step is a command given to the ECU by the power control apparatus 300 in consideration of the driving environment of the hybrid vehicle of the present invention, and is stored by the power control apparatus 300. From the required torque T, engine speed $w_e$, battery power $P_b$, and engine torque command $T_e^*$, the fuel margin $\Delta \dot{m}_f$ of the previous step is calculated using Equation 2 (S513). Thereafter, the fuel margins $\Delta \dot{m}_f$ of all previous steps (k=1 to k=n−1) are summed up (S514). The fuel margin values in steps k=1 to k=n−2 are already stored in the power control apparatus 300.

In addition, the input battery power $P_b$ of the immediately preceding step (k=n−1) and the stored battery power $P_b$ of the previous steps (k=1 to k=n−2) are summed (S515). From the summed (S514) fuel margin $$\sum_{k=1}^{n-1} \Delta \dot{m}_{f,k}$$

and the summed (S515) battery power $$\sum_{k=1}^{n-1} P_{b,k},$$

the equivalent factor $\lambda_n$ of the current step (k=n) is calculated by Equation (6) (S516).

Alternatively, as described above, in order for the equivalent factor to change appropriately according to the change of the driving environment, the forgetting factor (y) is applied to reduce the weight for the past information in the equivalent factor calculation, and according to Equation 7, the current step (k=n), an equivalent factor $\lambda_n$ can also be calculated.

Values such as current and voltage may be received from the BMS. However, since the battery power $P_b$ is simply calculated by the power control device 300 from this, in FIG. 4, it is summarized that $P_b$ is received from the BMS.

Figure 8:
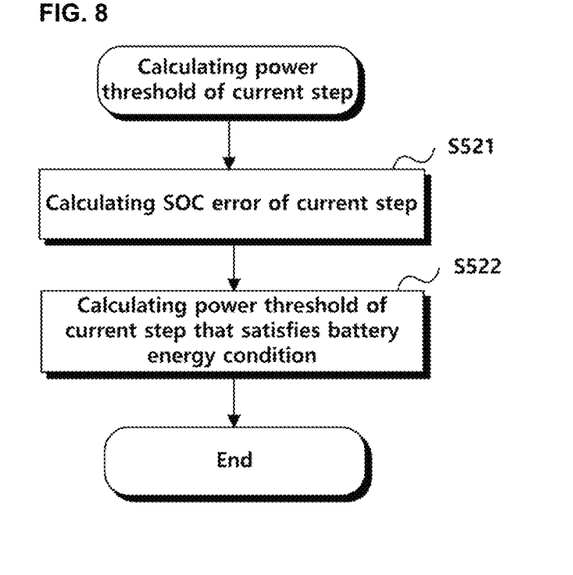
FIG. 8 is a flowchart illustrating a power threshold calculation process of a power threshold calculation unit of a power control apparatus according to the present invention, in consideration of the driving environment of the hybrid vehicle.

FIG. 8 is a flowchart illustrating a power threshold calculation process of the power threshold calculation unit 322 of the power control apparatus 300 according to the present invention, in consideration of the driving environment of the hybrid vehicle.

The higher the power threshold, the less frequent the engine intervention, the more battery power is used, and the average battery SOC decreases.

Conversely, as the power threshold is lowered, the frequency of engine intervention increases, reducing the use of battery power, and increasing the battery SOC on average. Accordingly, there is a specific power threshold that satisfies the battery energy condition $\int_{t_o}^{t} P_b(T)d\tau=0$ or $SOC(t_o)=SOC(t)$.

The power threshold can be calculated by any method that satisfies the battery energy condition as described above. As an example thereof, there is a method of calculating the power threshold using the SOC-based PI control, which may be calculated by the equation shown in Equation (8).

$$P_{th,n} = P_{th,0} + K_P e_{SOC,n} + K_I \sum_{k=1}^{n} e_{SOC,k} \text{ where,} \quad \text{[Equation 8]}$$
$$e_{SOC,n} = SOC_n - SOC_0$$

In Equation 8, as the current SOC increases, the SOC error $e_{SOC,n}$ increases positively, and the power threshold $P_{th},n$ also increases. As described above, since the frequency of engine intervention is reduced, a lot of battery power is used. Accordingly, the battery SOC decreases on average. Conversely, the smaller the current SOC, the smaller the $e_{SOC,n}$, and the power threshold $P_{th},n$ also decreases. As described above, the frequency of engine intervention increases and the use of battery power decreases. Accordingly, the battery SOC increases again on average. This makes it possible to obtain a specific power threshold that satisfies the above-described battery energy condition $\int_{t_o}^{t} P_b(T)d\tau=0$ or $SOC(t_o)=SOC(t)$.

To summarize the power threshold calculation method with reference to FIG. 8, first, the SOC error ($e_{SOC,n}$) of the current step is calculated (S521), and from this value, for example, as shown in Equation 8, the power threshold of the current step that satisfies the battery energy condition is calculated (S522).

Figure 9:
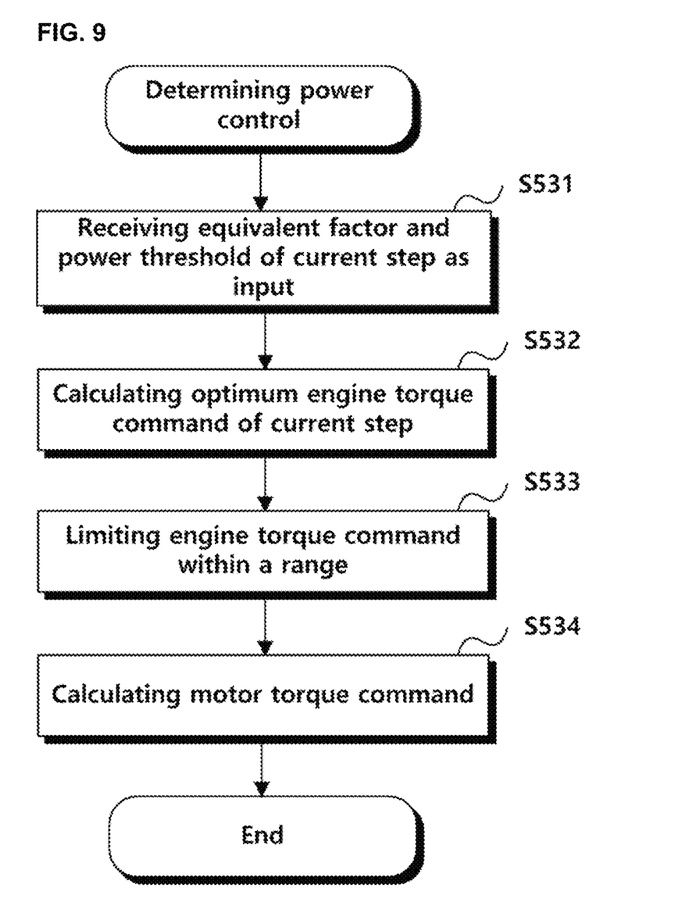
FIG. 9 is a flowchart illustrating a power control determination process of a power control determination unit of the power control apparatus according to the present invention, in consideration of the driving environment of the hybrid vehicle.

FIG. 9 is a flowchart illustrating a power control determination process of the power control determination unit 330 of the power control apparatus 300 according to the present invention, in consideration of the driving environment of the hybrid vehicle.

First, the power control determination unit 330 receives the following input: the equivalent factor of the current step (k=n) calculated by the equivalent factor calculation unit 321, and the power threshold of the current step calculated by the power threshold calculation unit 322 (S531). From this, the optimum engine torque of the current step is calculated (S532). The method is as follows.

The equivalent fuel consumption in the current step is expressed as Equation (9).

$$\dot{m}_{eq,n} = \begin{cases} \dot{m}_{f,n} + \lambda_n P_{b,n} & (P_n \geq P_{th,n}) \\ \dot{m}_{f,n} & (P_n < P_{th,n}) \end{cases} \quad \text{[Equation 9]}$$

Where, $P_n = T_n \omega_{m,n}$, $P_n$ is the required power at the current step, $P_{th,n}$ is the power threshold at the current step, $P_{b,n}$ is the battery power at the current step, $\lambda_n$ is the equivalent factor at the current step, $T_n$ is the required torque at the current step, $W_{m,n}$ is the motor speed at the current step, and $\dot{m}_{f,n}$ is the instantaneous fuel consumption at the current step.

Equation 10 is an equation for obtaining the optimum engine torque $T_{e,n}^*$ that minimizes the equivalent fuel consumption $\dot{m}_{eq,n}$.

$$T_{e,n}^* = \underset{T_e}{\mathrm{argmin}}\, \dot{m}_{eq,n} = \begin{cases} f(w_{m,n}, \lambda_n, T_n) & (P_n \geq P_{th,n}) \\ 0 & (P_n < P_{th,n}) \end{cases} \quad \text{[Equation 10]}$$

At this time, when the engine torque command $T_{e,n}^*$ calculated by Equation 10 (S532) is smaller than the minimum reference value ($T_e^{min}$) or greater than the maximum reference value ($T_e^{max}$) of the engine torque, it is limited to within those values as in Equation 11 (S533). The minimum and maximum values of engine torque are determined by the limits of engine torque and motor torque.

$$T_{e,n}^* = \begin{cases} T_e^{min} & (T_{e,n}^* < T_e^{min}) \\ T_{e,n}^* & (T_e^{min} \leq T_{e,n}^* \leq T_e^{max}) \\ T_e^{max} & (T_{e,n}^* > T_e^{max}) \end{cases} \quad \text{[Equation 11]}$$

The motor torque command $T_{m,n}^*$ is calculated by Equation 12 as the difference between the requested torque and the engine torque command (S534).

$$T_{m,n}^* = T_n - T_{e,n}^* \quad \text{[Equation 12]}$$

Figure 10A:
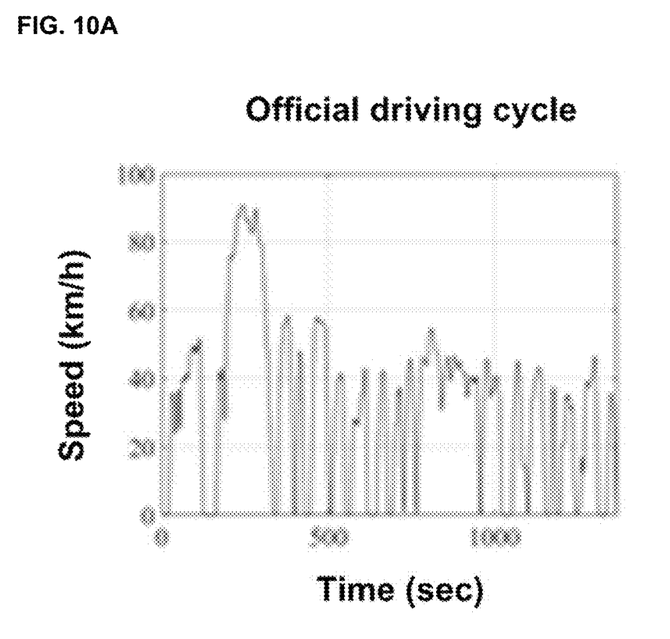
FIGS. 10A and 10B are diagrams showing the certified driving cycle and the actual driving environment of the small parcel truck, respectively.
Figure 10B:
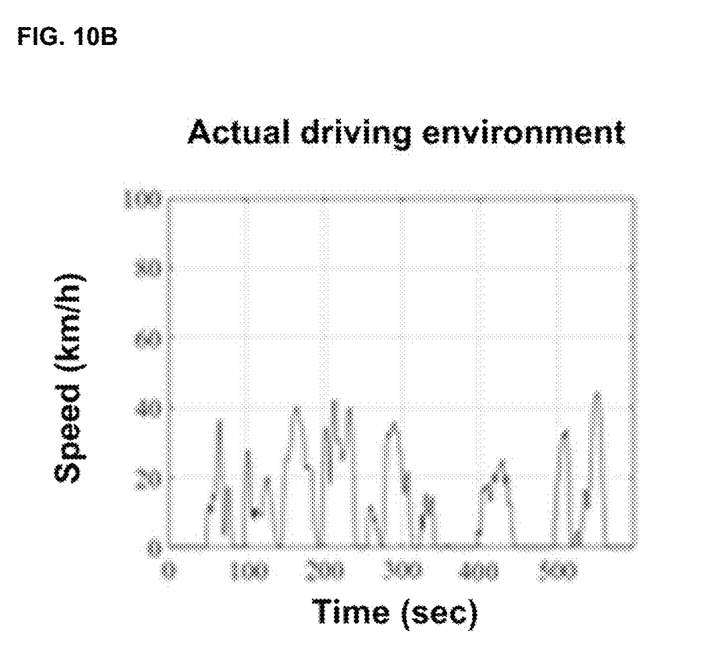

FIGS. 10A and 10B are views showing comparison between the official driving cycle and the actual driving environment of a small parcel delivery truck, respectively.

Small delivery trucks are operated under unfavorable conditions of: (1) frequent stops, and accelerations/decelerations, and (2) real-time load fluctuations due to changes in load capacity. This actual driving environment shown in FIG. 10B is significantly different from the official driving cycle (FTP75, etc.) shown in FIG. 10A for evaluating the fuel efficiency of the vehicle. Even in hybridization of a small parcel delivery truck with such severe driving environment changes, it is difficult to optimally derive its fuel efficiency performance using the conventional method.

However, the power control method by the power control apparatus 300 of the present invention having real-time adaptability to any driving environment can be very effectively used in such a small hybrid delivery truck.

What is claimed is:

1. A method for controlling power of a hybrid vehicle in consideration of the driving environment, comprising the steps of:
   (a) calculating a weight (hereinafter, 'equivalent factor'), wherein an equivalent fuel consumption is defined as a sum of an instantaneous fuel consumption and a weighted battery power, and the weighted battery power is provided by multiplying a battery power by the weight;
   (b) calculating a specific reference value of a driver's required power, wherein the equivalent fuel consumption is defined differently based on the specific reference value (hereinafter, 'power threshold');
   (c) calculating torque commands for an engine and a motor using the equivalent factor and the power threshold; and,
   (d) transmitting the calculated engine torque command to an engine control unit to control the engine and the calculated motor torque command to a motor control unit to control the motor,
   wherein the step (a) includes the steps of:
   (a1) receiving, as input, required torque ($T_k$), engine speed ($w_{e,k}$), and battery power ($P_{b,k}$) of a previous step (k=n−1) respectively from a pedal mac, the engine control unit, and a battery management system:
   (a2) calculating a fuel margin ($\Delta \dot{m}_{f,k}$) of the previous step (k=n−1) by $\Delta \dot{m}_{f,k} = \dot{m}_{f,k}(\omega_{e,k}, T_{e,k}^*) - \dot{m}_{f,k}(\omega_{e,k}, T_k)$;
   (a3) summing up the fuel margin of all previous steps (k=1 to k=n−1):
   (a4) summing up the battery power ($P_{b,k}$) of all previous steps (k=1 to k=n−1); and,
   (a5) calculating the equivalent factor of a current step (k=n) from summed up values of steps (a3) and (a4) and wherein $T_{e,k}^*$ is an engine torque command at step k.

2. The method of claim 1, wherein the step (a5) is calculated by $$\lambda_n = \frac{-\sum_{k=1}^{n-1} \Delta \dot{m}_{f,k}}{\sum_{k=1}^{n-1} P_{b,k}},$$

where $\lambda_n$ is the equivalent factor of the current step (k=n).

3. The method of claim 1, wherein the step (a5) is calculated by $$\lambda_n = \frac{-\left(\gamma \sum_{k=1}^{n-2} \Delta \dot{m}_{f,k} + \Delta \dot{m}_{f,n-1}\right)}{\left(\gamma \sum_{k=1}^{n-2} P_{b,k} + P_{b,n-1}\right)},$$

where y is a forgetting factor to reduce weight on past information and $\lambda_n$ is the equivalent factor of the current step (k=n).

4. The method of claim 1, wherein the required torque ($T_{n-1}$), the engine speed ($w_{e,n-1}$) and the battery power ($P_{b,n-1}$) of the previous step, and the fuel margin ($\Delta \dot{m}_{f,n-1}$) of the previous step are stored in a storage device, and wherein the required torque stored in the storage device is used as $T_{e,n-1}^*$ in step (a2).

5. The method of claim 1, wherein the step (b) includes the steps of:
   (b1) calculating an SOC error of the current step (k=n) by $e_{SOC,n} = SOC_n - SOC_0$, and,
   (b2) calculating the power threshold of the current step that satisfies a battery energy condition by using the $e_{SOC,n}$.

6. The method of claim 5, wherein the battery energy condition is given as $SOC(t_0)=SOC(t)$.

7. The method of claim 6, wherein the power threshold of the current step in step (b2) is calculated by $$P_{th,n} = P_{th,0} + K_p e_{SOC,n} + K_I \sum_{k=1}^{n} e_{SOC,k},$$

where the $P_{th,0}$ is an initial set value of the power threshold and $K_p$, $K_I$ are control gains of $e_{SOC,n}$ and $$\sum_{k=1}^{n} e_{SOC,k},$$

respectively.

8. The method of claim 1, wherein the step (c) includes the steps of:
   (c1) calculating the engine torque of a current step using the equivalent factor calculated in step (a) and the power threshold calculated in step (b);
   (c2) calculating the motor torque of the current step.

9. The method of claim 8, wherein an optimum engine torque ($t_{e,n}^*$) of the current step (k=n) of the step (c1) is determined as an engine torque value that minimizes the equivalent fuel consumption ($\dot{m}_{eq,n}$) of the current step by $$T_{e,n}^* = \underset{T_e}{\operatorname{argmin}} \, \dot{m}_{eq,n} = \begin{cases} f(w_{m,n}, \lambda_n, T_n) & (P_n \geq P_{th,n}) \\ 0 & (P_n < P_{th,n}) \end{cases},$$

where $w_{m,n}$ is a motor speed of the current step, $\lambda_n$ is the equivalent factor of the current step, $T_n$ is the required torque at the current step, $P_{th,n}$ is the power threshold at the current step and $P_n$ is the driver's required power of the current step.

10. The method of claim 9, wherein the equivalent fuel consumption ($\dot{m}_{eq,n}$) of the current step calculated by $$\dot{m}_{eq,n} = \begin{cases} \dot{m}_{f,n} + \lambda_n P_{b,n} & (P_n \geq P_{th,n}) \\ \dot{m}_{f,n} & (P_n < P_{th,n}) \end{cases},$$

where $P_{b,n}$ is the battery power at the current step.

11. The method of claim 8, wherein, between the step (c1) and the step (c2) further including the step of:
   (c11) limiting the calculated engine torque within a specific range, wherein, in the step (c11), a final engine torque command is determined by $$T_{e,n}^* = \begin{cases} T_e^{min} & (T_{e,n}^* < T_e^{min}) \\ T_{e,n}^* & (T_e^{min} \le T_{e,n}^* \le T_e^{max}) , \\ T_e^{max} & (T_{e,n}^* > T_e^{max}) \end{cases}$$

where Temin is a minimum reference value of engine torque, and T; ax is a maximum reference value of engine torque.

12. The method of claim 8, wherein the motor torque command of the current step in step (c2) is calculated by $T_{m,n}^* = T_n - T_{e,n}^*$.

13. An apparatus for controlling power of a hybrid vehicle in consideration of the driving environment, comprising:
at least one processor, and
at least one memory for storing computer-executable instructions,
wherein the computer-executable instructions stored in the at least one memory, when executed by the at least one processor, causes the at least one processor to perform operations comprising:
(a) calculating a weight (hereinafter, 'equivalent factor'), wherein an equivalent fuel consumption is defined as a sum of an instantaneous fuel consumption and a weighted battery power, and the weighted battery power is provided by multiplying a battery power by the weight;
(b) calculating a specific reference value of a driver's required power, wherein the equivalent fuel consumption is defined differently based on the specific reference value (hereinafter, 'power threshold');
(c) calculating torque commands for an engine and a motor using the equivalent factor and the power threshold; and,
(d) transmitting the calculated engine torque command to an engine control unit to control the engine and the calculated motor torque command to a motor control unit to control the motor,
wherein the step (a) includes the steps of:
(a1) receiving, as input, required torque ($T_k$), engine speed ($w_{e,k}$), and battery power ($P_{b,k}$) of a previous step (k=n−1) respectively from a pedal map, the engine control unit, and a battery management system;
(a2) calculating a fuel mar-gin ($\Delta \dot{m}_{f,k}$) of the previous step (k=n−1) by $\Delta \dot{m}_{f,k} = \dot{m}_{f,k}(\omega_{e,k}, T_{e,k}^*) - \dot{m}_{f,k}(\omega_{e,k}, T_k)$;
(a3) summing up) the fuel mar-gin of all previous steps (k=1 to k=n−1);
(a4) summing up) the battery power ($P_{b,k}$) of all previous steps (k=1 to k=n−1); and,
(a5) calculating the equivalent factor of a current step (k=n) from summed up values of steps (a3) and (a4)
and wherein $T_{e,k}^*$ is an engine torque command at step k.

* * * * *